United States Patent Office 3,130,144
Patented Apr. 21, 1964

3,130,144
CHEMICALLY TREATED ASPHALT
Lloyd G. Bostwick, Media, Pa., and John A. Hedge, Holy Oke, Del., assignors to Sun Oil Company, Philadelphia, Pa., a corporation of New Jersey
No Drawing. Filed Sept. 19, 1961, Ser. No. 139,070
4 Claims. (Cl. 208—44)

This invention relates to the chemical treatment of asphalt and particularly to the treatment of asphalt with nitric acid.

Numerous chemical treatments have been developed for increasing the hardness of asphalt. While air blowing is satisfactory for the purpose, air blowing equipment is expensive to install and operate; and the process is rather slow. Moreover, air blowing is only practical for large-volume operation.

Small quantities of asphalt have been treated chemically to improve penetration and softening point. Such chemicals as hydrochloric acid, nitric acid, sulfuric acid, aluminum halides, boron fluoride and sodium hydroxide have been used with varying degrees of success.

It is the object of this invention to provide an improved process of upgrading asphalt with nitric acid.

We have found that the effect of nitric acid on asphalt is greatly improved by the presence of certain metals in that a higher degree of hardness is obtained under similar processing conditions.

More specifically, we have found that when iron, zinc, or aluminum is added as a component in the nitric acid treatment of asphalt, the hardness of the product is increased. Melting points are also increased when the treatment is carried out in the presence of the active metals.

The process may be applied to asphalts and tars from any source. Most asphalts are vacuum distillation bottoms obtained in the processing of asphaltic crude oils. These asphalts may have received further treatment by solvent extraction or by oxidation. Blended and cut-back asphalts as well as native asphalts are also suitable feedstocks. These asphalts are characterized by high penetrations and low melting points. The specifications of oxidized and partially oxidized asphalts are improved by the process of the invention. The asphalts treated by the process of the invention may be used for paving, floor tiles, roofing shingles, and the like.

The nitric acid is present in the reaction mixture in amounts ranging from about .1 to .9 millimol per gram based on the asphalt. The strength of the acid must be at least 20 percent, and a particularly suitable concentration range is from about 25 percent to about 70 percent. Higher acid concentration can be used if desired.

Suitable metals for use in the process of the invention include iron, aluminum, and zinc. The metal is present in the reaction mixture in amounts ranging from .001 to 1.0 percent by weight based on the asphalt. The metal can be in the form of powder, wire, metal wool, shavings, or any other finely divided form.

The reaction is carried out in any suitable vesesl. The reaction mixture is heated to a temperature in the range of from 80 to 300° C. Pressure is not a critical factor, and pressures ranging from subatmospheric to 200 p.s.i.g. can be used. Atmospheric pressure is preferred. The reaction mixture should be agitated to obtain thorough contact of the acid and metal with the asphalt. Solvents can be used if desired. Contact times can range from 5 minutes to 12 hours. Longer times may be used, but little advantage is gained.

The table shows the effect of iron, zinc, and aluminum on nitric acid treatment of a Venezuelan asphalt at 110° C. and atmospheric pressure. Penetrations were obtained following the procedure set forth in ASTM D-5-52. Ring and ball softening points were obtained using the standard procedure of ASTM D-36-26.

The asphalt treated in each of the following examples was a vacuum tower bottoms having the following properties:

Softening point—100° F.
Solubility in 86° naphtha—81%.
Penetration @ 32° F.—41 mm.
Viscosity @ 210° F. (Saybolt-furol)—580 sec.
Mol. wt. (ebulliscopic-benzene)—815.
Hydroxyl No.—1.67.
Elemental Analysis:
    Percent C _____ 85.40
    Percent H _____ 10.21
    Percent O _____ 0.40
    Percent S _____ 2.93
    Percent N _____ 0.55

| Example No. | Asphalt (gms.) | Treatment (15 min. at 110° C.) | Penetration, .1 mm. (50 gm.—5 sec.) | R. & B., ° F. |
|---|---|---|---|---|
| 1 | 17.43 | Control—2 ml. distilled water | 180 | 86 |
| 2 | 14.83 | 1.0 ml. 40% nitric acid | 47 | 125 |
| 3 | 15.53 | 1.0 ml. 40% nitric acid +0.02 g. steel wool. | 42 | 135.5 |
| 4 | 35.28 | .5 ml. 40% nitric acid | 140 | |
| 5 | 35.14 | .5 ml. 40% nitric acid +0.16 g. iron powder. | 110 | |
| 6 | 27.22 | 2.0 ml. 40% nitric acid +0.065 g. zinc (80 mesh). | 38 | 142 |
| 7 | 30.01 | 1.0 ml. 40% nitric acid +.08 g. aluminum foil—strips. | 65.8 | |
| 8 | 29.96 | 2.0 ml. 40% nitric acid +.08 aluminum foil—strips. | 41.0 | |

Run 1 is a control run in which 2 ml. of distilled water was used. A comparison of Run 3 with Run 2 shows that addition of the metal to the acid treating agent results in improved penetration and softening point. A comparison of Runs 5, 6, and 7 with the nitric acid runs shows that the use of iron, zinc, and aluminum in conjunction with nitric acid results in an improved asphalt.

We claim:
1. A process for improving the penetration and softening point of asphalt comprising treating the asphalt with nitric acid and a metal selected from the group consisting of iron, zinc, and aluminum at a temperature in the range of from about 80° C. to about 300° C. for a time of from about 5 minutes to about 12 hours, said acid having a concentration of from 20 to 70 percent and being present in the reaction mixture in amounts ranging from .1 to .9 millimols of acid per gram of asphalt and said metal being present in the reaction mixture in amounts ranging from .001 to 1.0 wt. percent based on the asphalt charge.
2. A process according to claim 1 wherein the metal is iron.
3. A process according to claim 1 wherein the metal is zinc.
4. A process according to claim 1 wherein the metal is aluminum.

References Cited in the file of this patent

UNITED STATES PATENTS

| | | |
|---|---|---|
| 2,179,208 | Burk et al. | Nov. 7, 1939 |
| 2,313,596 | Sorem et al. | Mar. 9, 1943 |
| 2,421,421 | Hoiberg | June 3, 1947 |

FOREIGN PATENTS

| | | |
|---|---|---|
| 547,530 | Great Britain | Sept. 1, 1942 |